US008328207B2

(12) United States Patent
Hirose et al.

(10) Patent No.: US 8,328,207 B2
(45) Date of Patent: Dec. 11, 2012

(54) ENGINE GENERATOR

(75) Inventors: Tadafumi Hirose, Wako (JP); Masanori Shin, Wako (JP); Makoto Uchimi, Wako (JP); Takayuki Aoki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 787 days.

(21) Appl. No.: 12/490,670

(22) Filed: Jun. 24, 2009

(65) Prior Publication Data

US 2009/0322046 A1 Dec. 31, 2009

(30) Foreign Application Priority Data

Jun. 27, 2008 (JP) ................................ 2008-168810
Jun. 27, 2008 (JP) ................................ 2008-169128

(51) Int. Cl.
*B62B 1/20* (2006.01)

(52) U.S. Cl. .................. 280/47.131; 290/1 R; 290/1 B; 280/47.17; 280/47.34

(58) Field of Classification Search ............ 280/47.371, 280/47.17, 47.19, 47.34, 200, 652, 655, 655.1, 280/43.1, 43.14, 47.131, 47.315; 290/1 R, 290/1 B, 47

See application file for complete search history.

(56) References Cited

U.S. PATENT DOCUMENTS 6,935,642 B1 8/2005 Craig et al.
2007/0108767 A1 * 5/2007 Hirose et al. .................. 290/1 A
2008/0238221 A1 * 10/2008 Yamamoto et al. ............ 310/51

FOREIGN PATENT DOCUMENTS

JP 55-009801 U 1/1980
JP 06-001091 U 1/1994
JP 10-250583 A 9/1998
JP 2005-076550 A 3/2005
JP 2008-037429 A 2/2008

OTHER PUBLICATIONS

Japanese Office Action dated Jan. 24, 2012, issued in corresponding Japanese Patent Application No. 2008-169128.

* cited by examiner

*Primary Examiner* — J. Allen Shriver, II
*Assistant Examiner* — James Triggs
(74) *Attorney, Agent, or Firm* — Westerman, Hattori, Daniels & Adrian, LLP

(57) ABSTRACT

An engine generator movable on left and right wheels. The wheels are provided on a rear section of a bottom cover via an axle. A cylinder of an engine is disposed so as to incline upwards towards the direction of the axle. Inclining the cylinder lowers the center of gravity of the engine and disposes the axle positioned below the cylinder at a high position, thereby reducing the height of the engine generator. The orientation of the engine generator during travel is stabilized.

4 Claims, 14 Drawing Sheets

ENGINE GENERATOR

FIELD OF THE INVENTION

The present invention relates to an engine generator having wheels, a case accommodating an engine and a draw handle extending upwardly from a front upper part of the case.

BACKGROUND OF THE INVENTION

An engine generator of this type is already known as disclosed in Japanese Patent Application Laid-Open Publication No. 2005-76550 (JP 2005-076550 A).

The known engine generator comprises a bottom cover to which leg sections and wheels are provided, an engine provided to the bottom cover via an attachment member and accommodated in a case, and a handle for transportation provided to the front section, which is the opposite side of the wheels.

The handle for transportation extends from left and right end sections of the case substantially horizontal to the direction in which the handle lever separates from the case, and grips are provided to the distal ends of the left and right handle levers.

According to the engine generator, grasping and lifting the left and right grips allows support legs to be maintained in a state separated from a road surface. The engine generator is transported by pushing the handle for transportation in a state in which the support legs are lifted above the road surface, thereby causing the wheels rotate. However, in the above engine generator, a axle supporting the wheels is located below the bottom cover; in other words, in a low position. As a result, extension lines that extend from the axle to the grips are located lower than the center of gravity of the engine generator. Specifically, the center of gravity of the engine generator is located higher than the extension lines that extend from the axle to the grips. Therefore, when the engine generator is being moved on uneven ground or similar terrain by lifting the left and right grips and causing the wheels to rotate, the engine generator is susceptible to tilting or overturning in a direction orthogonal to the direction of movement of the engine generator, in other words, in a direction of the width of the engine generator. As a result, care is necessary to prevent the engine generator from tilting to the left or the right when the engine generator is being moved. A demand accordingly exists for there to be developed a technique allowing the engine generator to be moved in a stable state.

SUMMARY OF THE INVENTION

It is therefore an object of the present invention to provide an engine generator capable of maintaining a stable orientation during transportation.

According to the present invention, there is provided an engine generator which comprises: a bottom cover to which left and right wheels are provided via an axle; an engine/generator unit having an engine and a generator driven by and integrated with the engine, the engine/generator unit being provided above the bottom cover via a plurality of mounting members; a case for accommodating the engine/generator unit jointly with the bottom cover; and a draw handle vertically swingably provided on an upper section of the case on a side opposite from a side where the left and right wheels are provided, wherein the engine includes a drive shaft extending parallel to the axle and a cylinder disposed in an inclined state pointing upwards towards the axle, the axle is positioned below the cylinder and above the mounting members, and the wheels provided on the axle are disposed internally of side walls of the case.

In the present invention, the cylinder of the engine is inclined towards the direction of the axle, thereby allowing the engine's center of gravity to be lowered. It is also possible to dispose the axle below the cylinder, above the mounting members and in a high position. As a result, the height of the engine generator can be kept low.

By lowering the engine's center of gravity, and keeping the height of the engine generator low, the height of the center of gravity of the engine generator can thus be kept low. Keeping the center of gravity of the engine generator low allows extension lines from the axle to the grips of the draw handles to be at substantially the same height as the position of the center of gravity of the engine generator. Therefore, when the engine generator is being moved on uneven ground or similar terrain by lifting the grips and causing the wheels to rotate, the engine generator is less susceptible to tilting or overturning in a direction orthogonal to the direction of movement of the engine generator, in other words, towards the left or the right. The engine generator can thus be maintained in a stable orientation, and readily moved.

Preferably, each of the left and right wheels is contained in a recess formed respectively in two corner sections of the bottom cover, and a portion of the wheel that is exposed in each of the recesses contacts a road surface. Therefore, only the portion of the wheels that contacts the road surface is allowed to protrude from the recesses. As a result, the bottom surface of the engine generator can be lowered in a simple manner.

Preferably, the bottom cover has a left and right leg section, which leg sections are provided to two corner sections of the bottom cover, the corner sections being in positions opposite to the positions where the left and right wheels are provided, so that the left and right wheels and the left and right leg sections support the bottom cover substantially horizontally. Therefore, the bottom cover can be supported substantially horizontally using the wheels and the leg sections, and the engine generator can be used in a stable orientation.

Desirably, the bottom cover comprises a axle lateral rib that has a accommodating recess for accommodating the axle of the left and right wheels, the accommodating recess being on a bottom surface of the bottom cover; and a central rib that extends in a longitudinal direction of the engine generator at the widthwise center of the bottom cover, so as to be orthogonal to the axle lateral rib.

By providing the axle lateral rib and the central rib to the bottom cover, each rib thus can effectively increase the stiffness of the bottom cover. As a result, stiffness of the bottom cover can be ensured even when the bottom cover is formed of a plastic material. As a result, the weight of the engine generator can be reduced, and the stiffness of the engine generator can be ensured.

In addition, accommodating the axle of the wheels in the accommodating recess of the axle lateral rib enables the axle to be used as a member for reinforcing the bottom cover. As a result, the stiffness of the bottom cover can be further improved without separately providing a member for reinforcing the bottom cover. As a result, the weight of the bottom cover can be further reduced, and the stiffness of the bottom cover can be further increased.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
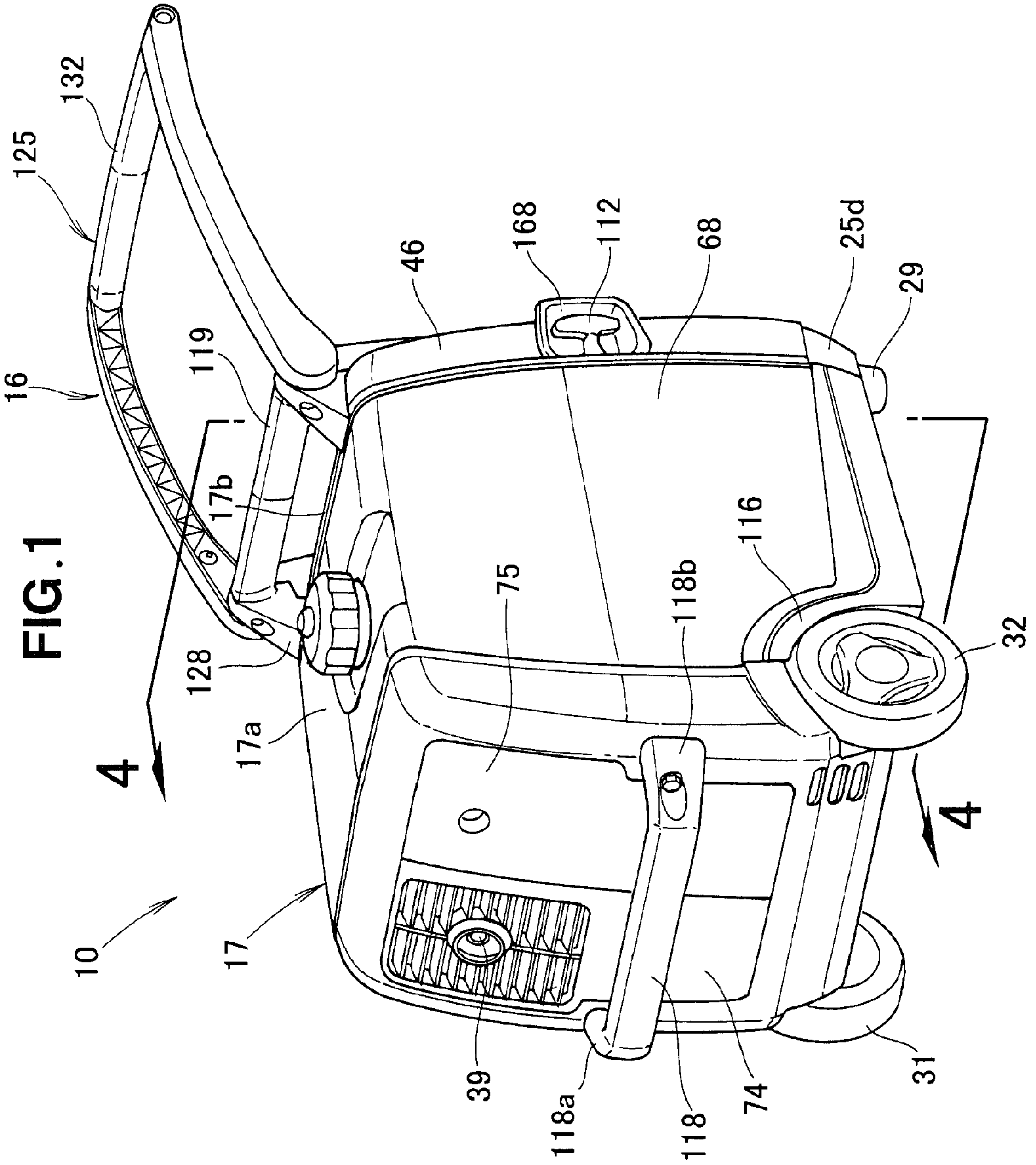
FIG. 1 is a perspective view showing an engine generator according to an embodiment of the present invention.
Figure 2:
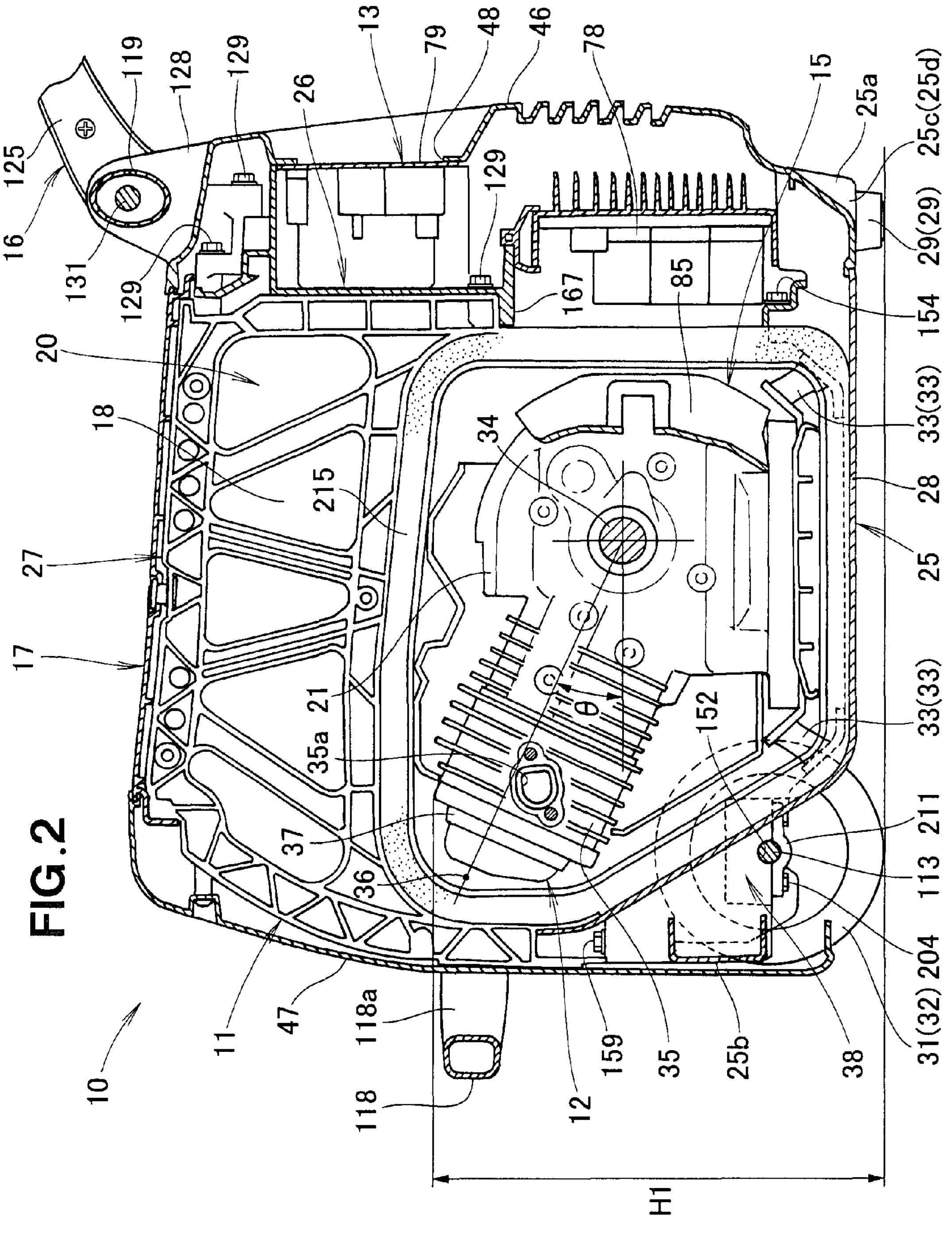
FIG. 2 is a cross-sectional view illustrating the engine generator of FIG. 1.

As shown in FIG. 1 and FIG. 2, an engine generator 10 comprises: a skeletal member 11; an engine/generator unit 12 provided to the skeletal member 11; an electrical component section 13 for controlling the output of the engine/generator unit 12; an intake/fuel feed mechanism 14 (see FIG. 4) for feeding fuel to the engine/generator unit 12; a cooling structure 15 for directing cooling air to the engine/generator unit 12; a transport structure 16 for transporting the engine generator 10; a case 17 for covering the engine/generator unit 12 and the electrical component section 13; an insulating member 18 for partitioning accommodation space 20 inside the case 17; and a muffler 23 (see FIG. 4) provided to an engine 21 of the engine/generator unit 12.

The engine generator 10 has left and right leg sections 29 provided to left and right corner sections 25*c*, 25*d* (see FIG. 5) of a front-end part 25*a* of the bottom cover 25 constituting the bottom section of the skeletal member 11, and left and right wheels 31, 32 provided to the rear-end part 25*b*.

The left and right corner sections 25*c*, 25*d* are two corner sections positioned at the front, which is the side opposite from the left and right wheels 31 and 32. The left and right leg sections 29 are each formed using a rubber member.

The bottom cover 25 is disposed substantially horizontally when the left and right leg sections 29 and the left and right wheels 31, 32 are in contact with the ground. As a result, the engine generator can be used in a stable orientation.

The engine/generator unit 12 is mounted on the bottom cover 25 of the skeletal member 11 via four mounting members (mount members) 33. The engine 21 and a generator 22 (see FIG. 4) driven by the engine 21 are integrally provided to the engine/generator unit 12.

Figure 4:
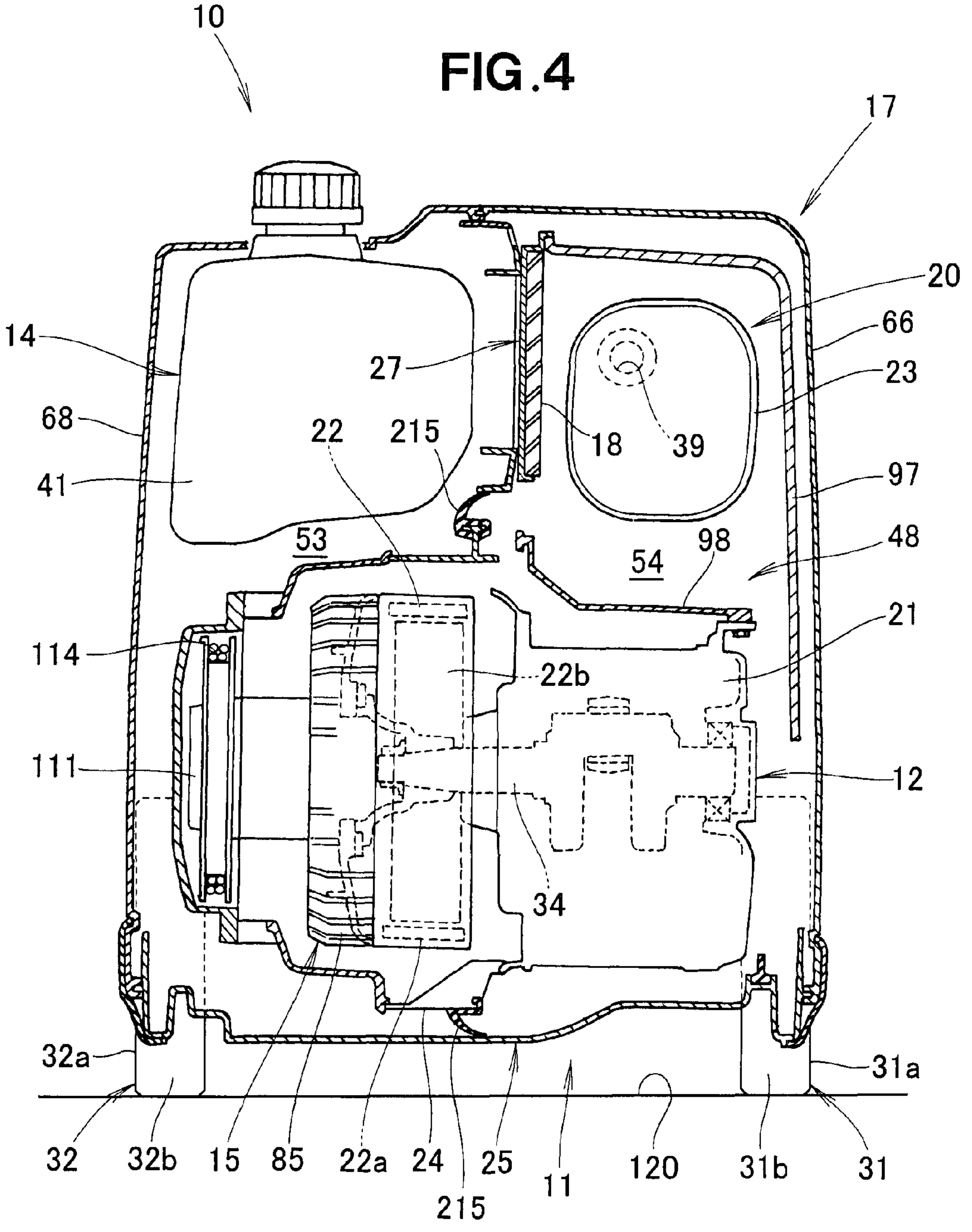
FIG. 4 is a cross-sectional view taken along line 4-4 of FIG. 1.

The generator 22 is provided coaxially with respect to a drive shaft (crank-shaft) 34 of the engine 21 as shown in FIG. 4.

A cylinder block (cylinder) 35 is disposed from the drive shaft 34 at an incline of angle θ towards the left and right wheels 31, 32 (i.e. the direction of an axle 113 that supports the left and right wheels 31, 32).

Reference numeral 36 shown in FIG. 2 shows the center of the cylinder in the cylinder block 35.

Inclining the cylinder block 35 of the engine 21 at angle θ allows the height H1 of the engine 21 to be reduced. The height of the engine generator 10 can thereby be reduced, and the engine generator 10 can be made more compact.

Adequate wheel accommodation space 38 can be provided below the cylinder block 35 in a state in which the cylinder block 35 of the engine 21 is inclined at the angle θ. The left and right wheels 31, 32 are disposed in the wheel accommodation space 38. The engine generator 10 can be made even more compact by having the left and right wheels 31, 32 disposed in the wheel accommodation space 38.

A configuration for attaching the left and right wheels 31 and 32 to the bottom cover 25 is described later based on FIG. 3 and FIG. 14.

Positioning a cylinder head 37 in the vicinity of a case section 47 allows an ignition plug or a tappet (a component of a valve mechanism that moves according to a cam and transfers motion to an exhaust valve or an intake valve) to be disposed in the vicinity of the rear case section 47. Removing the left and right covers 74, 75 for maintenance (FIG. 1) provided to the rear case section 47 thereby allows inspection of the ignition plug or adjustment of the tappet to be conducted from the outside in a simple manner.

Inclining the cylinder block 35 at an angle θ, and positioning an intake port 35*a* of the cylinder block 35 in the vicinity of the rear case section 47, allows a carburetor 101 (see FIG. 5) mounted on the intake port 35*a* to be disposed in the vicinity of the rear case section 47. Removing the left and right covers 74, 75 for maintenance provided to the rear case section 47 thereby allows the carburetor 101 to be readily inspected from the outside.

Figure 3:
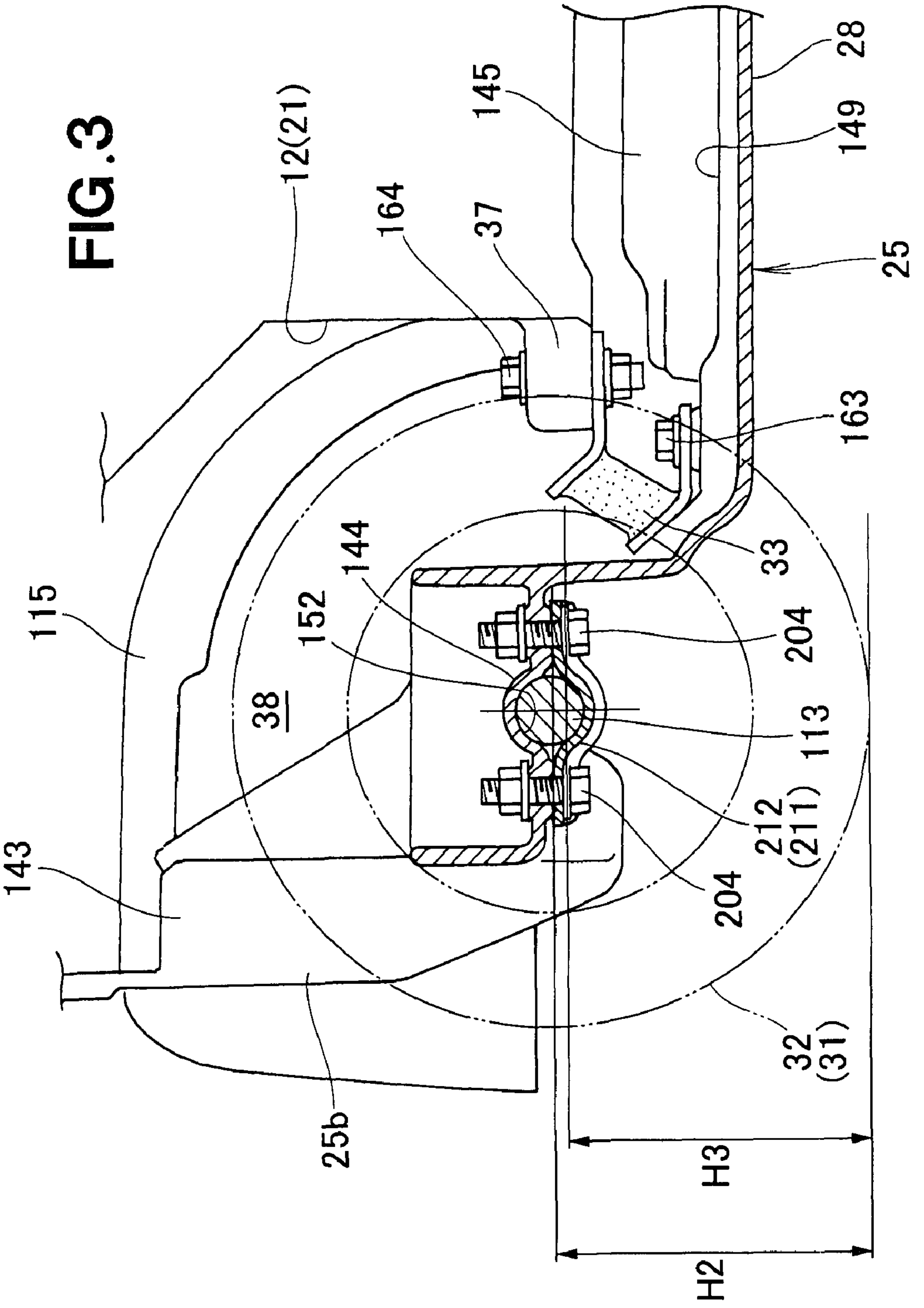
FIG. 3 is a cross-sectional view showing a relationship between a bottom cover and an axle of FIG. 2.

As shown in FIG. 3, the bottom cover 25 has a axle lateral rib 144 formed extending in the lateral direction of the generator body in the vicinity of a rear-end section 25*b*. The axle lateral rib 144 is formed in a substantially reversed U-shape in cross section, and has an accommodating recess 152 for accommodating the axle 113 on a bottom surface 28 of the bottom cover 25. The axle 113 extends in the lateral direction of the generator body (left-right direction) and is disposed parallel to the drive shaft 34 of the engine 21.

The axle 113 is supported by left and right axle support members 211, 212 (FIG. 10) when accommodated in the accommodating recess 152. Left and right axle support members 211, 212 are attached to the bottom surface 28 of the bottom cover 25 by bolts 204, 204. Left and right wheels 31, 32 are rotatably mounted on the left and right end sections of the axle 113.

By ensuring that the wheel accommodation space 38 is provided below the cylinder block 35 of the engine 21 as illustrated in FIG. 2, the left and right wheels 31, 32 are disposed in the wheel accommodation space 38. The left and right wheels 31, 32 can thereby be upwardly disposed (in other words, a high position). The axle 113 which is disposed lower than the cylinder block 35 can thereby be disposed higher than the mounting members 33 of the engine/generator unit 12. Specifically, height H2 of the axle 113 is set higher than height H3 of the mounting members 33.

Disposing the left and right wheels 31, 32 using the wheel accommodation space 38 thus allows the left and right wheels 31, 32 to be disposed upwards (a high position). The engine generator 10 can thereby be made more compact.

As shown in FIG. 4, the engine/generator unit 12 is mounted on the bottom cover 25 in a state in which the drive shaft 34 of the engine 21 is laterally disposed facing the left/right direction. The drive shaft 34 of the engine/generator unit 12 is made to rotate by the driving of the engine 21. The rotation of the drive shaft 34 is transmitted to a cooling fan 85 and the cooling fan 85 rotates. The rotation of the cooling fan 85 causes a rotor 22*a* of the generator 22 to rotate along the external periphery of a stator 22*b*. The rotation of the rotor 22*a* generates power.

The muffler 23 is provided above the engine 21 of the engine/generator unit 12. The muffler 23 discharges exhaust gas from the cylinder block 35 (FIG. 2) of the engine 21 via an exhaust port 39.

A fuel tank 41 of the intake/fuel feed mechanism 14 is provided above the generator 22 of the engine/generator unit 12.

A case 17 is formed to be substantially U-shaped in cross section. An accommodation space 20 is formed by the case 17 and the bottom cover 25 by mounting the case 17 on the bottom cover 25.

A cooling structure 15 is provided with a structure for cooling an inverter unit 78 (FIG. 2) of an electrical component section 13, the engine 21, and the muffler 23; and a structure for cooling the case 17.

An insulating member 18 is provided to a center frame 27, the insulating member 18 partitioning the accommodation space 20 of the case 17 at substantially the center of the accommodation space 20. The insulating member 18 partitions the accommodation space 20 into a cool area to the right side and a hot area 54 to the left side.

An elastic seal member 215 is provided to the engine/generator unit 12 to the entire periphery of a boundary section 24 of the engine and generator 22. The elastic seal member 215 partitions the cool area 53 and the hot area 54.

The engine/generator unit 12, the muffler 23, and the fuel tank 41 are accommodated inside the case 17 formed to be substantially U-shaped in cross-section. The case 17 is formed from polypropylene (PP) or another resin, and disposed above the bottom cover 25.

The case 17 has left and right side wall sections 66, 68. The left wheel 31 is disposed towards the center in the transverse direction of the case 17 with respect to the left-side wall section (side wall of the case) 66. The outside surface 31*a* of the left wheel 31 is disposed inwards (i.e. towards the center in the transverse direction of case 17) of the left-side wall section 66 so that the outside surface does not protrude beyond the left-side wall section 66.

The right wheel 32 is disposed towards the center in the transverse direction of the case 17 with respect to the right-side wall section (side wall of the case) 68. The outside surface 32*a* of the right wheel 32 is disposed inwards (i.e. towards the center in the transverse direction of case 17) of the right-side wall section 68 so that the outside surface does not protrude beyond the right-side wall section 68.

As shown in FIG. 2, the electrical component section 13 controls the output of the engine/generator unit 12, the electrical component section 13 being provided with a control panel 79 in the upper half section, and an inverter unit 78 in the lower half section. A switch for starting the engine, and an AC terminal, a DC terminal or the like for outputting generated power is provided to a control panel 79 so as to be outwardly exposed from an opening 48 in a front case section 46. The inverter unit 78 controls the output frequency of the generator 22.

Figure 5:
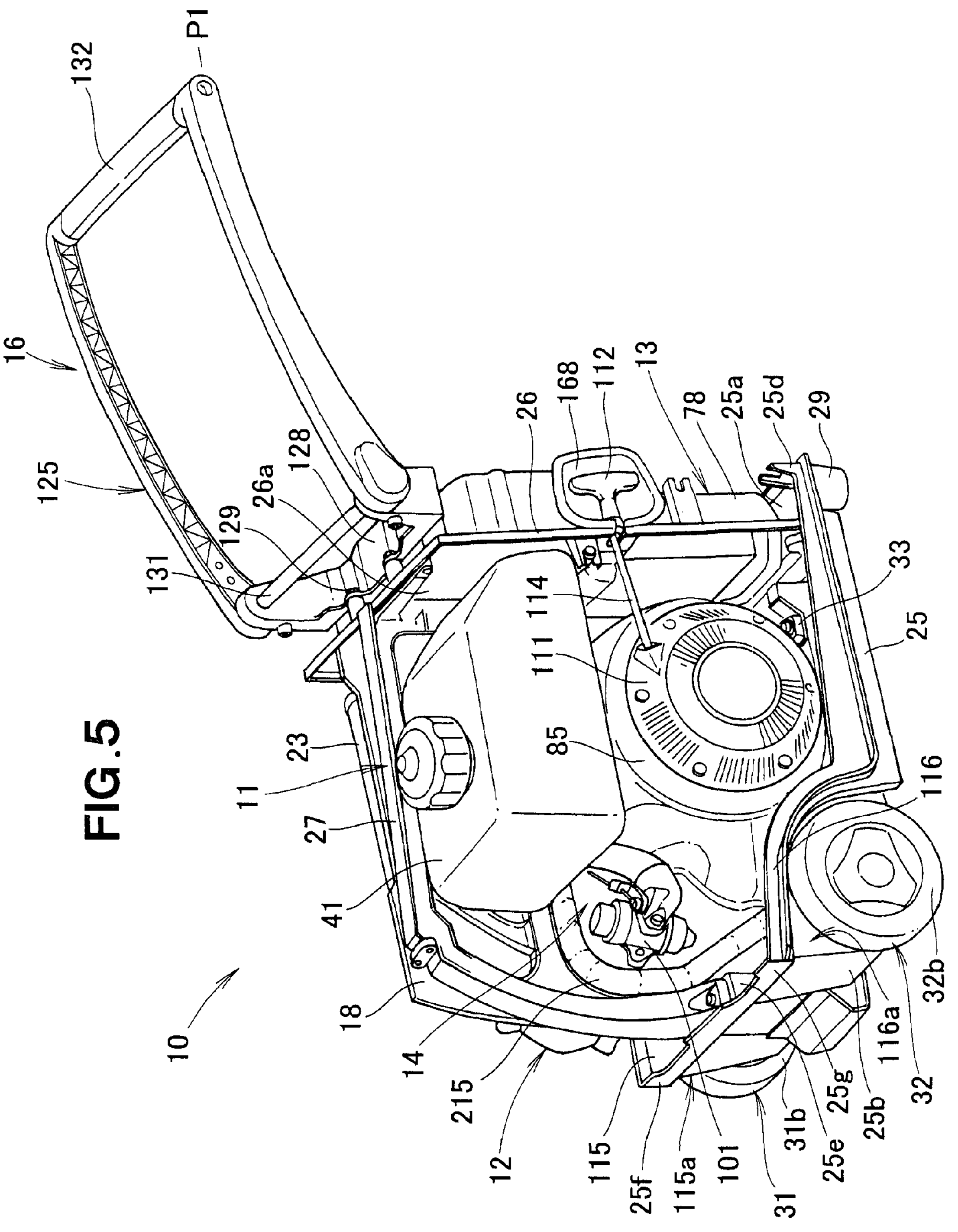
FIG. 5 is a perspective view showing the engine generator of FIG. 1 with a case removed.
Figure 10:
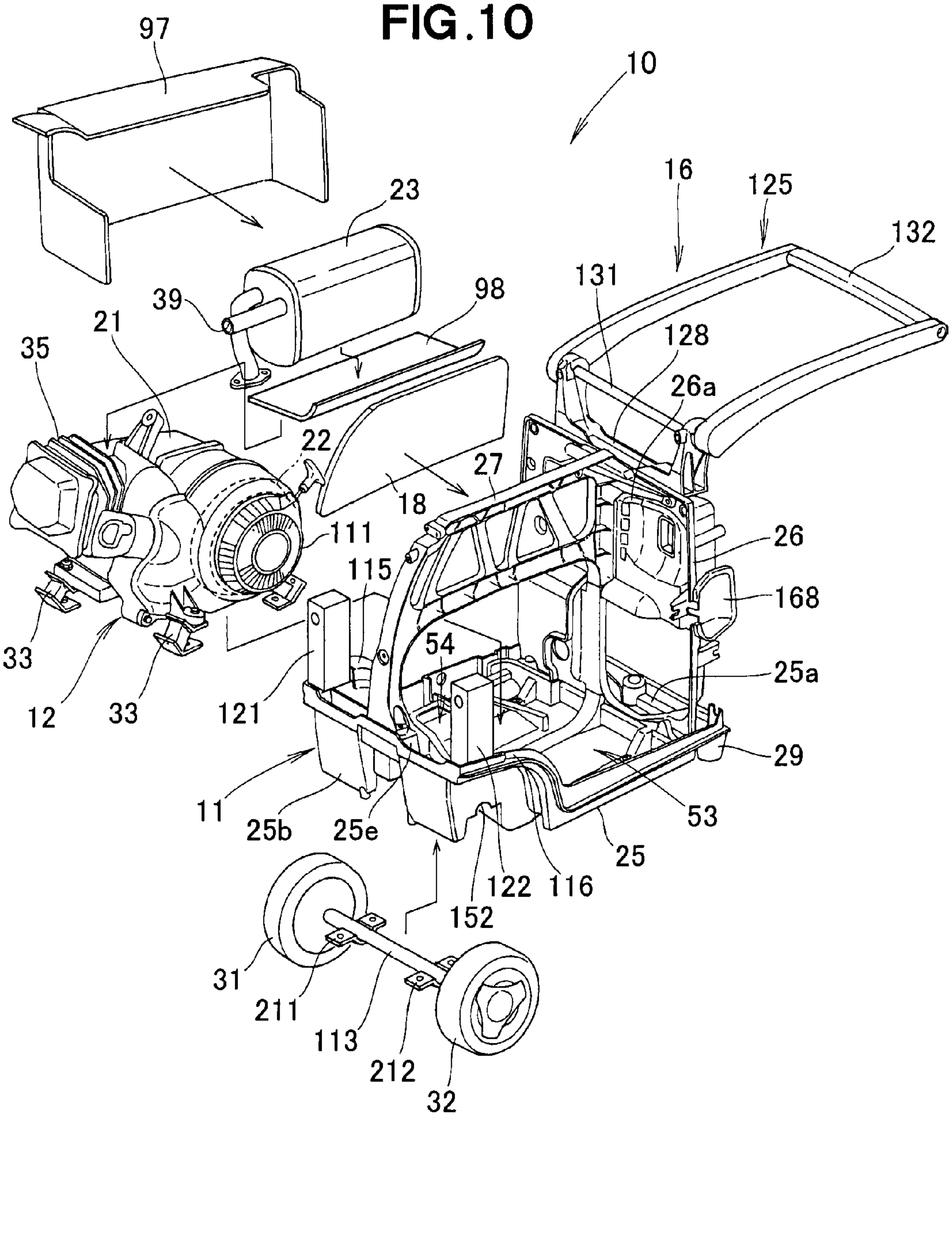
FIG. 10 is an exploded perspective view of the engine generator of FIG. 5.

As shown in FIG. 5 and FIG. 10, the intake/fuel feed mechanism 14 feeds fuel (fir-fuel mixture) to the engine 21 (FIG. 4) of the engine/generator unit 12. The intake/fuel feed mechanism 14 is provided with the fuel tank 41 disposed above the generator 22 (FIG. 4), and the carburetor 101 provided to the cylinder block 35 (FIG. 2) of the engine 21.

The fuel tank 41 is a tank for holding fuel to be fed to the engine 21. The carburetor 101 mixes fuel brought from the fuel tank 41 with air brought from an air cleaner (not shown), and feeds the air-fuel mixture to the engine 21. The fuel tank 41 and the carburetor 101 are disposed in the area to the right of the center frame 27 (insulating member 18), i.e., in the cool area 53 (FIG. 4). As shown in FIG. 4, the engine 21 and the muffler 23 are disposed in the area to the left of the center frame 27 (insulating member 18), i.e., in the hot area 54.

The skeletal member 11 comprises the bottom cover 25, which is formed to be able to support the engine/generator unit 12, a vertical frame 26 provided upright in the vicinity of the front-end part 25*a* of the bottom cover 25, and a center frame 27 that extends between an upper section center 26*a* of the vertical frame 26 and a rear-end center section 25*e* of the bottom cover 25.

As described above, the engine/generator unit 12 that is integrally provided with the engine 21 (see FIG. 4) and the generator 22 is mounted on the bottom cover 25 via four mounting members 33. A recoil starter is provided to the engine 21. The exhaust muffler 23 (FIG. 4) is provided above the engine 21.

As shown in FIG. 4, a case shroud 97 is provided on the outside of the muffler 23. An engine shroud 98 is provided between the engine 21 and the muffler 23.

The case shroud 97 and the engine shroud 98 guide outside air (cooling air) brought inside the case 17.

The insulating member 18 is provided to the center frame 27. As shown in FIG. 4, the insulating member 18 partitions the accommodation space 20 inside the case 17 into the cool area 53 and the hot area 54. The fuel tank 41 is disposed above the generator 22 (FIG. 4).

A rear stationary handle 118 (FIG. 1) of the transport structure 16 is provided to the rear-end section 25*b* of the bottom cover 25 via left and right handle support sections 121, 122 shown in FIG. 10. The left handle support section 121 is disposed upright on the left side section of the rear-end section 25*b*. The right handle support section 122 is disposed upright on the right side section of the rear-end section 25*b*.

As shown in FIG. 1, left and right end sections 118*a*, 118*a* of the rear stationary handle 118 are fixed to the left and right handle support sections 121, 122 using bolts 123.

The left and right wheels 31, 32 are rotatably provided to the bottom cover 25 via the axle 113 (FIG. 3). Specifically, as shown in FIG. 2, the wheel accommodation space 38 can be allowed for below the cylinder block 35, in a state in which the cylinder block 35 is inclined at an angle θ. Using this space, left and right wheel housings 115, 116 are formed on left and right corner sections (two corner sections) 25*f*, 25*g* of the rear-end section 25*b* of the bottom cover 25.

The left and right wheel housings 115, 116 each bulge so as to substantially curve upwards. Providing the left and right wheel housings 115, 116 allows left and right recesses 115*a*, 116*a* that are capable of accommodating the left and right wheels 31, 32 to be formed below the left and right wheel housings 115, 116.

The left wheel 31 is disposed in the left recess 115*a* below the left wheel housing 115. Only the portion 31*b* of the left wheel 31 in contact with the road surface 120 (FIG. 4) protrudes (is exposed) downward from the left recess 115*a*.

The right wheel 32 is disposed in the right recess 116*a* below the right wheel housing 116. Only the portion 32*b* of the right wheel 32 in contact with the road surface 120 (FIG. 4) protrudes (is exposed) downward from the right recess 116*a*.

The bottom section of the engine-driven generator 10 can thereby be lowered in a simple manner.

The left and right wheel housings 115, 116 are symmetrically arranged, as are the left and right recesses 115*a*, 116*a*.

A draw handle 125 of the transport structure 16 is provided to the vertical frame 26 of the skeletal member 11. Specifically, the draw handle 125 is swingably supported via a handle support section 128 in the vertical direction at an upper section center 26*a* of the vertical frame 26.

The upper section center 26*a* of the vertical frame 26 is positioned in a location 17*b* (FIG. 1) on the side where the upper section 17*a* (FIG. 1) of the case 17 is located and on the side opposite the left and right wheels 31, 32. A bolt 129 is used to fasten the handle support section 128 together with the center frame 27 on the upper section center 26*a* of the vertical frame 26. In other words, the draw handle 125 is positioned in a location 17*b* on the side where the upper section 17*a* of the case 17 is located and on the side opposite the left and right wheels 31 and 32.

The transport structure 16 comprises left and right wheels 31, 32, the rear stationary handle 118, a front stationary handle 119 (FIG. 1 and FIG. 2), and the draw handle 125. As shown in FIG. 2, the front stationary handle 119 is provided so as to cover a support shaft 131 of the draw handle 125.

According to the transport structure 16, the engine generator 10 is towed by swinging the draw handle 125 upwards about the support shaft 131 to the transport position P1, and grasping the grip 132 of the draw handle 125. In other words, grasping and lifting the grip 132 allows the left and right leg sections 29 to be lifted from the road surface 120. The left and right wheels 31, 32 are made to rotate and the engine generator 10 is transported (carried) by pulling the grip 132 in this state.

On the other hand, the draw handle 125 is swung downwards about the support shaft 131, and is held to the front case section 46 (FIG. 1). The engine generator 10 is lifted and carried in this state by grasping the rear stationary handle 118 and the front stationary handle 119.

Figure 6:
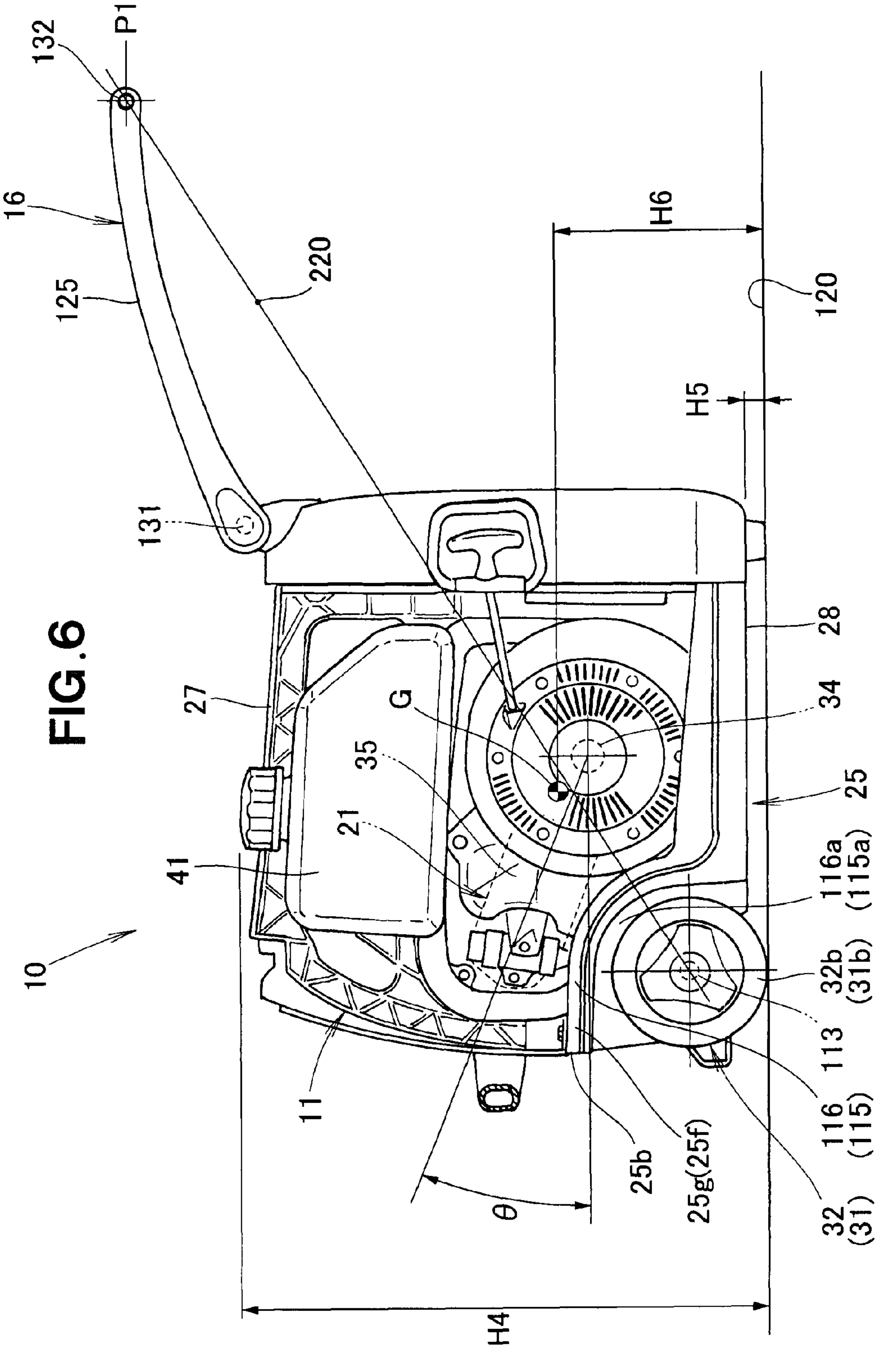
FIG. 6 is a side view showing the center of gravity position of the engine generator of FIG. 5.

As shown in FIG. 6, the cylinder block 35 of the engine 21 of the engine generator 10 is disposed in a state inclined at an angle θ toward the left and right wheels 31, 32 (i.e., toward the axle 113 for supporting the left and right wheels 31, 32) about the drive shaft 34. The height H1 of the engine 21 can be reduced (FIG. 2) and the height H4 of the engine generator 10 can be kept low by inclining the cylinder block 35 of the engine 21 at the angle θ.

Adequate wheel accommodation space 38 (FIG. 2) can be provided below the cylinder block 35 in a state in which the cylinder block 35 is inclined at the angle θ. The space 38 is used for forming the left and right wheel housings 115, 116 in the left and right corner sections 25*f*, 25*g* of the rear-end part 25*b* of the bottom cover 25.

Arranging the left and right wheels 31, 32 using the wheel accommodation space 38 allows the left and right wheels 31, 32 to be upwardly (in a high position) disposed. Accordingly, the bottom section of the engine generator 10; i.e., the height H5 of the bottom surface 28 of the bottom cover 25, can be kept low.

The left and right recesses 115*a*, 116*a* are formed below the left and right wheel housings 115, 116, respectively. The left wheel 31 is accommodated in the left recess 115*a*, and the right wheel 32 is accommodated in the right recess 116*a*, as shown in FIG. 5. Accordingly, only the portion 31*b* of the left wheel 31 in contact with the road surface 120 is allowed to protrude downwards from the left recess 115*a*.

Similarly, only the portion 32*b* of the right wheel 32 in contact with the road surface 120 is allowed to protrude downward from the right recess 116*a*. The bottom section of the engine generator 10; i.e., the height H5 of the bottom surface 28 of the bottom cover 25, can thus be lowered in a simple manner.

Keeping the height H4 of the engine generator 10 and the height H5 of the bottom surface 28 of the bottom cover 25 low thus allows the height position H6 of the center of gravity G of the engine generator 10 to be kept low. Keeping the height H6 of the center of gravity G of the engine-driven generator 10 allows an extension line 220 that extends from the axle 113 to the grip 132 of the draw handle 125 to be positioned in the vicinity of the center of gravity G of the engine generator. The draw handle 125 is positioned at a position P1 in which the engine generator is towed. Accordingly, when the engine generator 10 is being moved on uneven ground or similar terrain by lifting the grip 132 and causing the left and right wheels 31, 32 to rotate, the engine generator 10 is less susceptible to tilting or overturning in a direction orthogonal to the direction of movement; i.e., towards the left or the right. The engine generator 10 can thus be maintained in a stable orientation, and readily transported.

Inclining the cylinder block 35 of the engine 21 about the drive shaft 34 towards the axle 113 at angle θ sets the center of gravity of the engine 21 closer towards the axle 113. Setting the center of gravity of the engine 21 closer to the axle 113 allows the center of gravity of the engine 21 to be kept low without any movement in the lateral direction.

Figure 7:
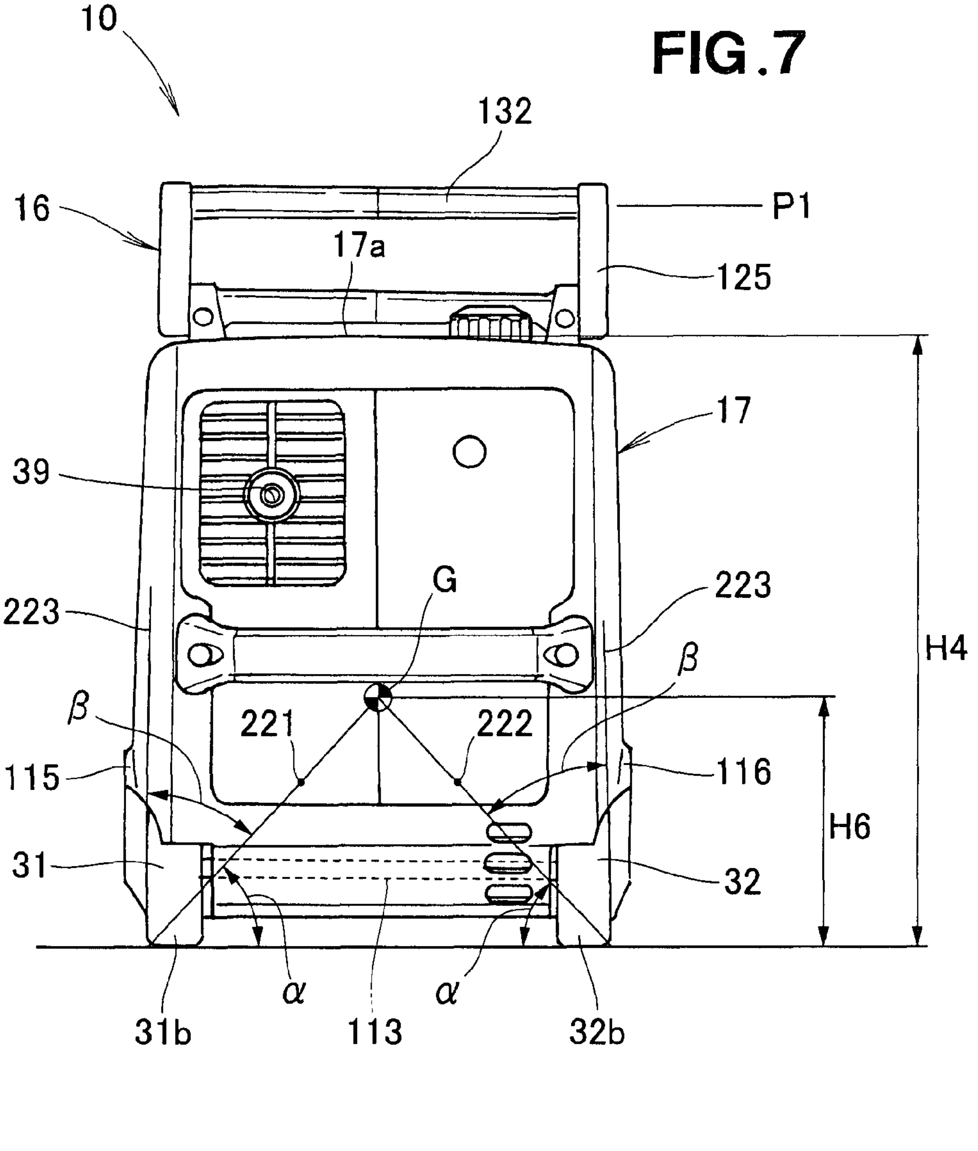
FIG. 7 is a rear view showing the center of gravity position of the engine generator.

Keeping the center of gravity of the engine 21 (FIG. 6) low without any movement in the lateral direction, as shown in FIG. 7, allows the center of gravity of the engine 21 to be positioned in substantially the center in the width direction of the engine generator 10. Accordingly, the height H6 is kept low and the center of gravity G of the engine generator 10 is positioned in substantially the center in the width direction of the engine generator 10. The inclination angle α of a left-side inclination line 221 that connects the left wheel 31 and the center of gravity G of the engine generator 10 can be kept small by having the center of gravity G of the engine generator 10 disposed in substantially the center of width direction. Accordingly, the angle β of the left-side inclination line 221 with respect to a vertical line 223 can be kept large. The angle β is the maximum inclination angle in a case where the engine generator 10 tilts to the left side. The maximum inclination angle β can thereby be made adequately large for instances where the engine generator 10 tilts to the left side.

Similarly, the inclination angle α of a right-side inclination line 222 that connects the right wheel 32 and the center of gravity G of the engine generator 10 can be kept small. The maximum inclination angle β can thereby be made adequately large for instances where the engine generator 10 tilts to the right side.

Figure 8A:
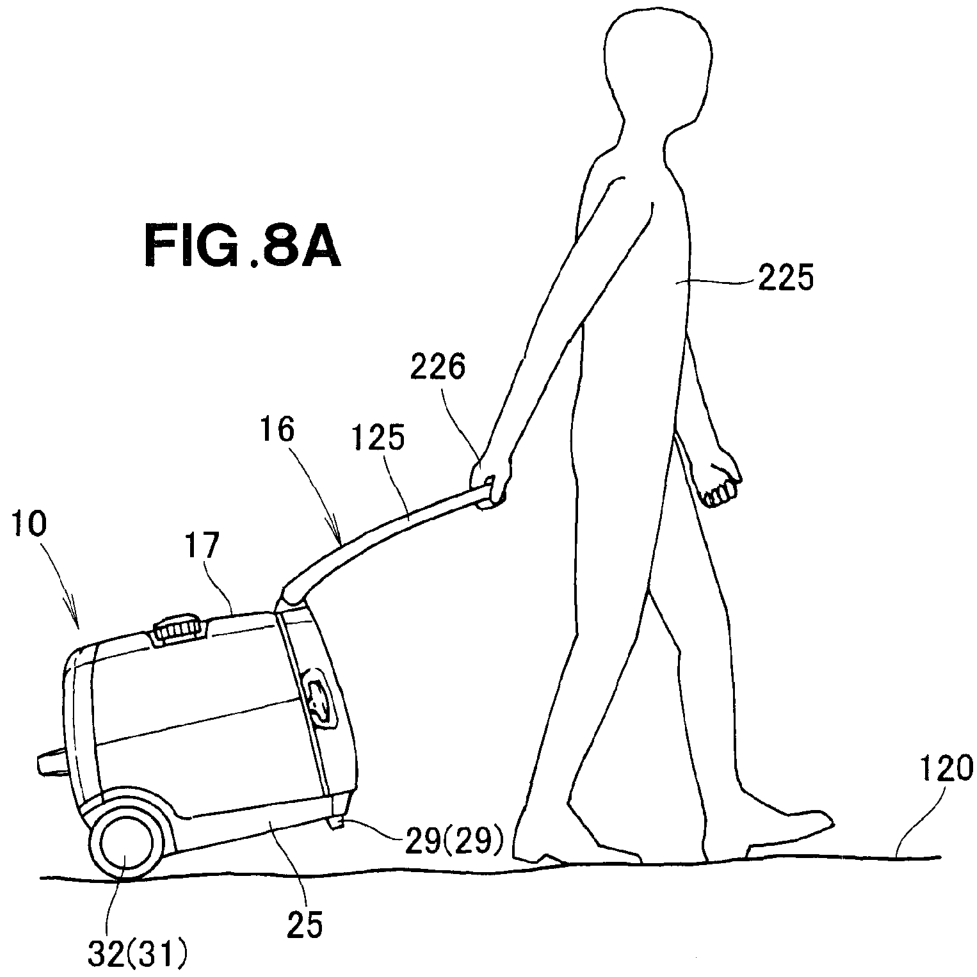
FIG. 8A and FIG. 8B are schematic views showing the engine generator being moved by pulling the draw handle.
Figure 8B:
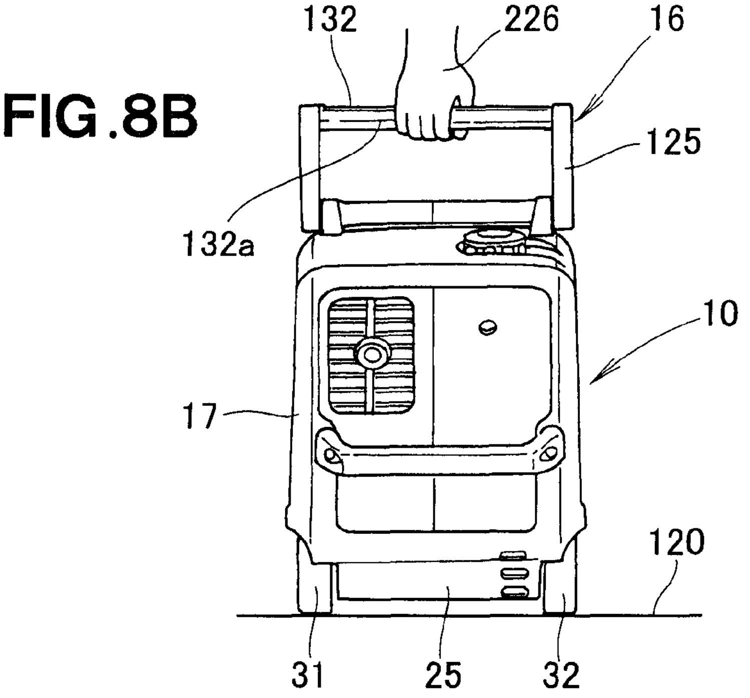

In FIG. 8A and FIG. 8B, the draw handle 125 is positioned in the transport position P1 (FIG. 6), and a section 132*a* substantially in the center of the grip 132 is grasped by a hand 226 of a person 225. The grip 132 is lifted, and the left and right leg sections 29 are lifted from the road surface 120. Pulling the grip 132 forwards in this state causes the left and right wheels 31, 32 to rotate, and the engine generator 10 to be moved forward.

Figure 9:
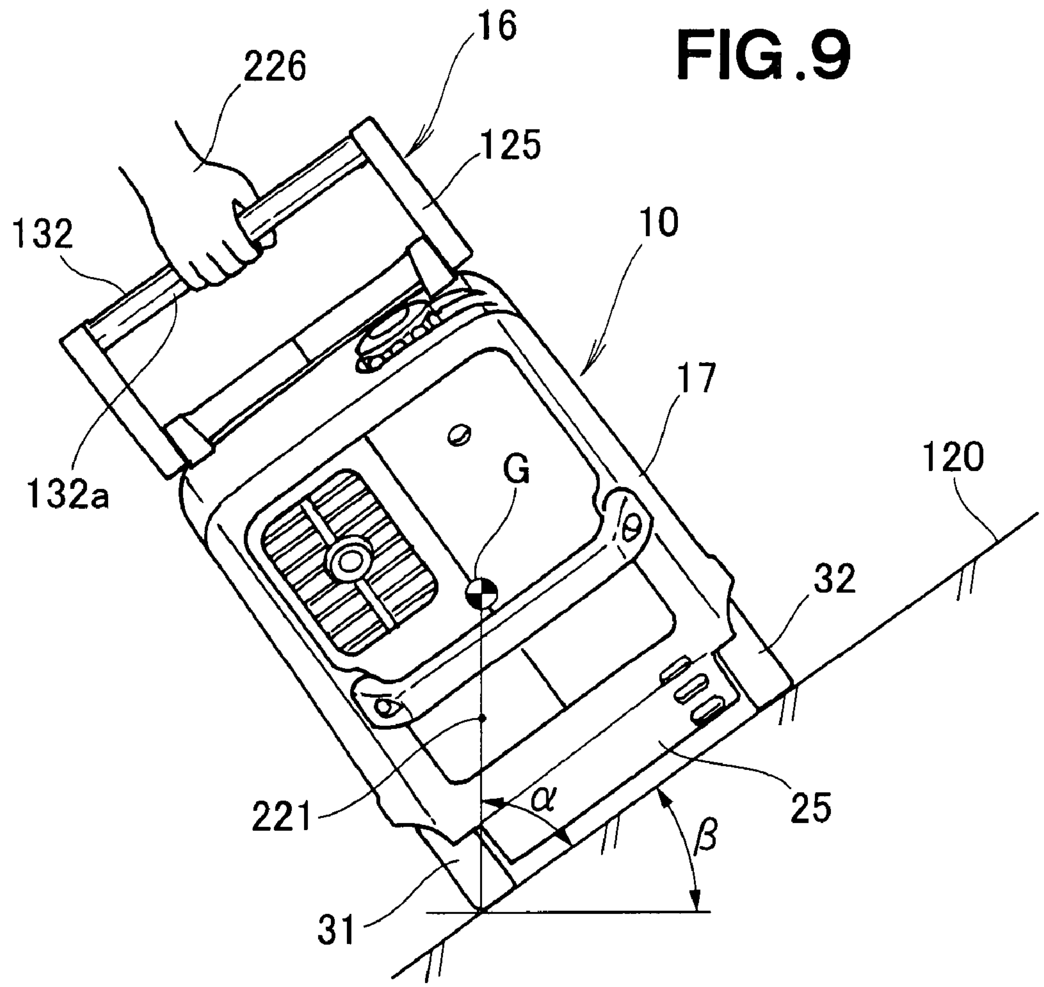
FIG. 9 is a view showing lateral stability when the engine generator is transported using the draw handle.

As shown in FIG. 9, the inclination angle α of the left-side inclination line 221 connecting the left wheel 31 and the center of gravity G of the engine generator 10 is kept small. Accordingly, a large maximum inclination angle β of the engine generator 10 is provided. The engine generator 10 is thereby less likely to tilt to the left side when transported over uneven ground or similar terrain.

As shown in FIG. 7, the inclination angle α of the right-side inclination line 222 connecting the right wheel 32 and the center of gravity G of the engine generator 10 is also kept small in the same manner as the left-side inclination line 221. The engine generator 10 is thereby less likely to tilt to the right side when transported over uneven ground or similar terrain.

The engine generator 10 can thus be kept in a stabilized orientation and made simpler to transport by making the engine generator 10 less likely to tilt in the left and right directions when it is being transported.

Figure 11:
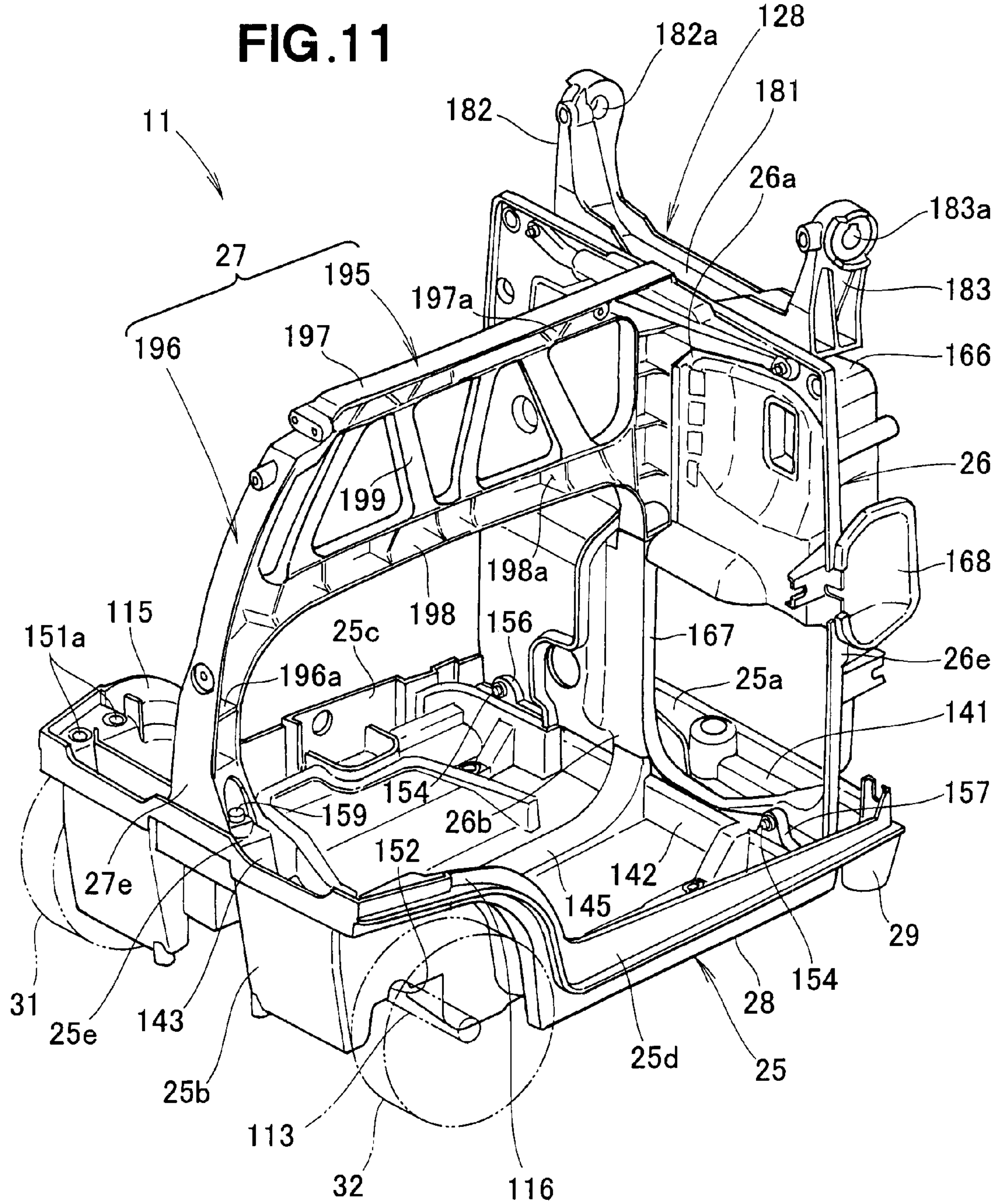
FIG. 11 is a perspective view of a skeletal member of the engine generator of FIG. 10.
Figure 12:
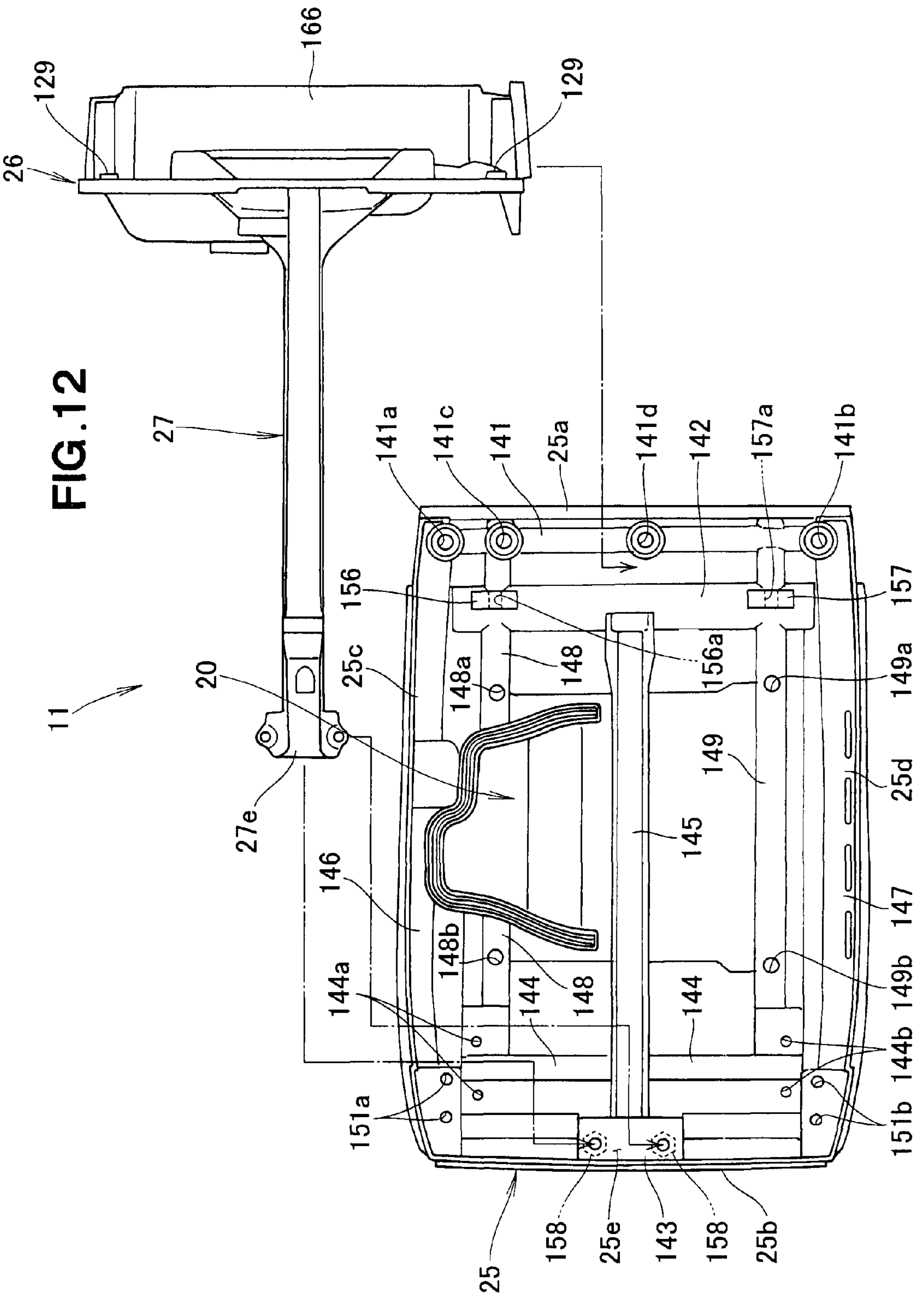
FIG. 12 is a top plan view of a bottom cover of the skeletal member of FIG. 11.
Figure 13:
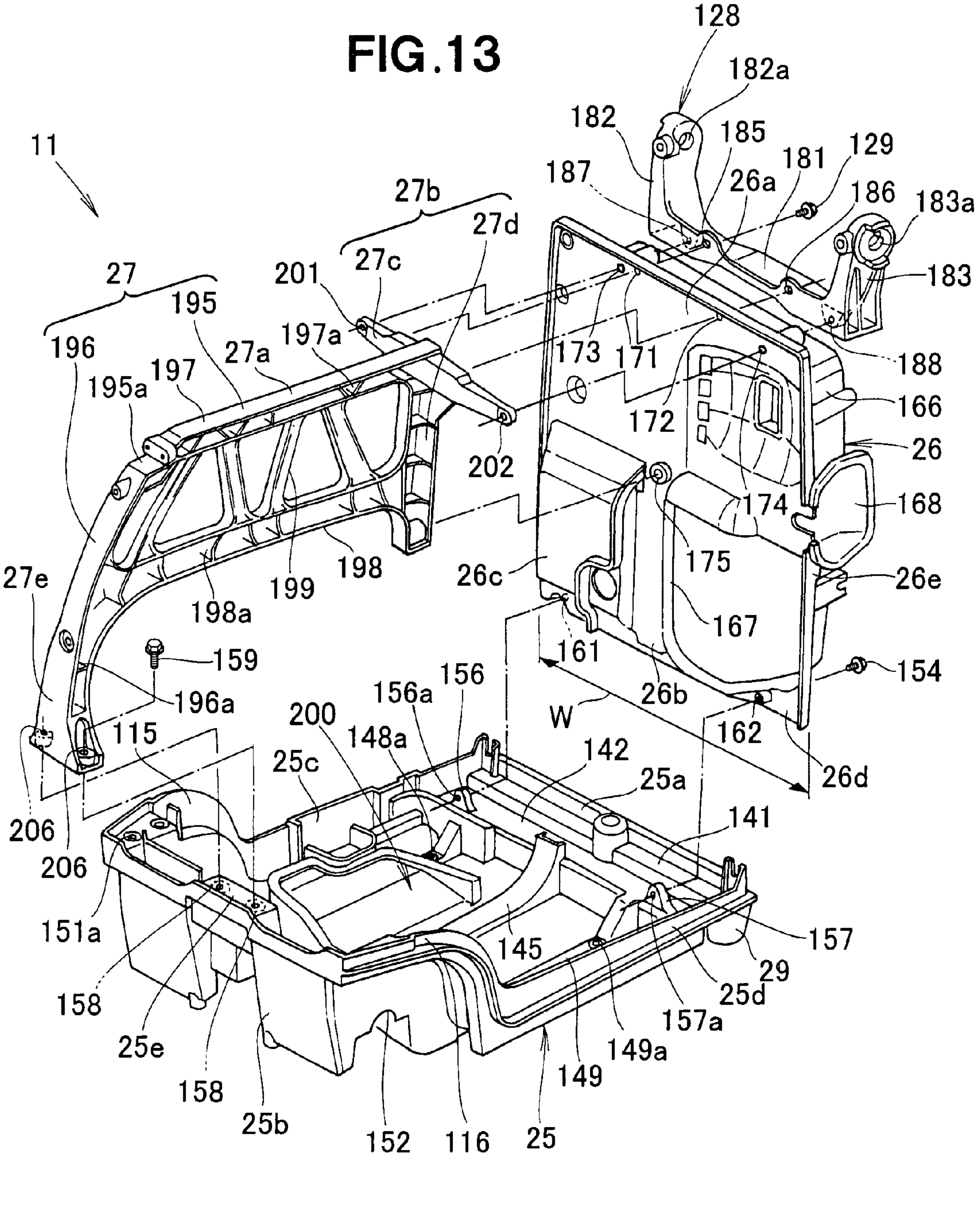
FIG. 13 is an exploded perspective view of the skeletal member shown in FIG. 11.

FIGS. 11, 12, and 13 show the skeletal member 11 of the engine generator 10.

The bottom cover 25 constitutes the bottom section of the skeletal member 11. The bottom cover 25 is formed from a high-stiffness resin, formed into a substantially rectangular shape by the front-end section 25*a*, the rear-end section 25*b*, the left side section 25*c* and the right side section 25*d*. Forming the bottom cover 25 from a high-stiffness resin allows the bottom cover 25 to be made thinner, allowing the bottom cover 25 to be made lighter.

The bottom cover 25 comprises: a front lateral rib 141 provided along the front-end section 25*a*; a front-vicinity lateral rib 142 provided to the rear of the front lateral rib 141 (i.e., the vicinity of the front-end section 25*a*); a rear lateral rib 143 provided to the center of the rear-end section 25*b*; a axle lateral rib 144 provided to the front of the rear lateral rib 143 (in i.e., the vicinity of the rear-end section 25*b*); a central rib 145 provided so as to be orthogonal to the axle lateral rib 144 and extending in the longitudinal direction of the engine generator; left and right side ribs 146, 147 provided to the left and right side sections 25*c*, 25*d* respectively; a left-vicinity side rib 148 provided nearer towards the center from the left side section 25*c* (i.e., in the vicinity of the left side section 25*c*); and a right-vicinity side rib 149 provided nearer towards the center from the right side section 25*d* (i.e., in the vicinity of the right side section 25*d*).

The axle lateral rib 144 has, at the bottom surface 28 of the bottom cover 25, the accommodating recess 152 for accommodating the axle 113 of the left and right wheels 31, 32.

The central rib 145 extends from the rear-end center section (other-end center) 25*e* to the front-end section (one end section) 25*a*. Specifically, the center rib 145 extends in the longitudinal direction of the engine generator 10.

The front lateral rib 141, the front-vicinity lateral rib 142, the rear lateral rib 143, and the axle lateral rib 144 each bulge upwards and are thereby formed in a substantially reverse U-shape in cross section.

The central rib 145, the left side rib 146, the right side rib 147, the left-vicinity side rib 148, and the right-vicinity side rib 149 each bulge upwards and are thereby formed in a reverse U-shape in cross section.

As described above, providing the front lateral rib 141, the front-vicinity lateral rib 142, the rear lateral rib 143, the axle lateral rib 144, the central rib 145, the left side rib 146, the right side rib 147, the left-vicinity side rib 148, and the right-vicinity side rib 149 to the bottom cover 25 allows the stiffness of the bottom cover 25 to be increased.

In particular, providing the axle lateral rib 144 and the central rib 145 orthogonally on the bottom cover 25 allows each of the ribs 144, 145 to efficiently increase the stiffness of the bottom cover 25. Accordingly, adequate stiffness of the bottom cover 25 can be obtained even when the bottom cover 25 is formed from a plastic material (high-stiffness resin). As a result, the engine generator 10 can be made lighter, and at the same time, adequate stiffness of the engine generator 10 can be obtained. Also, mounting the wheels 113 (FIG. 10) in the accommodating recess 152 of the axle lateral rib 144 allows the axle 113 to be used as a reinforcing member of the bottom cover 25.

The front lateral rib 141 has mounting holes 141*a*, 141*b* formed on the left and right end sections. The left and right leg sections 29 are mounted on the left and right mounting holes 141*a*, 141*b* using bolts (not shown). The front lateral rib 141 also has a pair of mounting holes 141*c*, 141*d* formed between the left and right mounting holes 141*a*, 141*b*.

The inverter unit 78 (FIG. 2) is attached to the pair of mounting holes 141*c*, 141*d* using a bolt (not shown).

Left and right frame supporting sections 156, 157 of the front-vicinity rib 142 protrude upwards from its left and right end sections. Mounting holes 156*a*, 157*a* for mounting the bottom end section 26*b* of the vertical frame 26 are formed on the left and right frame supporting sections 156, 157 respectively. The bottom end section 26*b* of the vertical frame 26 is mounted on the left and right mounting holes 156*a*, 157*a* using bolts 154.

A center supporting section; i.e., a rear-end center section 25*e*, is provided to the top-end section of the rear lateral rib 143. A pair of nuts 158 is insert-molded in the rear-end center section 25*e*. A rear-end lower section 27*e* of the center frame 27 is mounted to the pair of nuts 158 using bolts 159.

Left and right mounting holes 144*a*, 144*b* are formed respectively in the left and right end sections of the axle lateral rib 144. A left axle support member 211 (FIG. 10) is bolted onto the left mounting hole 144*a*, and a right axle support member 212 (FIG. 10) is bolted onto the right mounting hole 144*b*. Accordingly, the axle 113 (FIG. 10) of left and right wheels 31, 32 is mounted on the accommodating recess 152 using the left and right axle support members 211, 212.

Mounting holes 151*a*, 151*a* for mounting the left handle support member 121 (FIG. 10) are formed externally with respect to the left mounting hole 144*a*; i.e., the left side section of the rear-end section 25*b*. Mounting holes 151*b*, 151*b* for mounting the right handle support member 122 (FIG. 10) are formed externally with respect to the right mounting hole 144*b*; i.e., the right side section of the rear-end section 25*b*. Left and right handle support sections 121, 122 (FIG. 10) are mounted on the left and right mounting holes 151*a*, 151*b* using bolts (not shown).

The left-vicinity side rib 148 has mounting holes 148*a*, 148*b* formed so as to be spaced apart longitudinally. The right-vicinity side rib 149 has mounting holes 149*a*, 149*b* so as to be spaced apart longitudinally. Four mounting members 33 (FIG. 2) are mounted on the left mounting holes 148*a*, 148*b* and right mounting holes 149*a*, 149*b* using bolts 163 (FIG. 3).

The mounting members 33 are mounted on the mounting leg section 37 of the engine/generator unit 12 using a bolt 164, as shown in FIG. 3. The engine/generator unit 12 (FIG. 2) is thereby attached to the bottom cover 25 via mounting members 33 onto the left- and right-vicinity side ribs 148, 189.

As shown in FIG. 13, the vertical frame 26 is disposed along the front-vicinity lateral rib 142 of the bottom cover 25.

The vertical frame 26 is formed from a high-stiffness resin in the shape of a substantially rectangular wall made, and is formed in a wide shape so that the width W is substantially the same width as the bottom cover 25. Forming the vertical frame 26 from a high-stiffness resin allows the vertical frame 26 to be made thinner and lighter.

Left and right end sections 26*c*, 26*d* (both end sections) of the bottom end section 26*b* of the vertical frames 26 are in contact with the left and right frame supporting sections 156, 157. A mounting hole 161 of the left end section 26*c* is coaxially positioned with the mounting hole 156*a* of the left frame supporting section 156, and a mounting hole 162 of the right end section 26*d* is coaxially positioned with the mounting hole 157*a* of the right frame supporting section 157.

The left end section 26*c* of the vertical frame 26 is anchored to the left frame supporting section 156 by a bolt 154. The right end section 26*d* of the vertical frame 26 is anchored to the right frame supporting section 157 by a bolt 154. Accordingly, the vertical frame 26 is disposed upright in the width direction on the front-vicinity lateral rib 142 of the bottom cover 25.

Providing the vertical frame 26 on the front-vicinity lateral rib 142 allows the vertical frame 26 to be securely mounted on the bottom cover 25.

A canopy section 166 of the vertical frame 26 bulges outwards to the front from a front surface lower than the upper section center 26*a*. An opening 167 is formed on the lower right portion of the vertical frame 26. A knob accommodating section 168 is formed on a right side section 26*e* of the vertical frame 26.

As shown in FIG. 2, the control panel 79, the inverter unit 78 (see FIG. 2), and other components of the electrical component section 13 are mounted on the front surface below the canopy section 166 of the vertical frame 26. The opening 167 of the vertical frame 26 accommodates the rear section of the inverter unit 78, and brings outside air (cooling air) towards the cooling fan 85 (FIG. 4) after it has been brought inside the case 17 shown in FIG. 4.

The electrical component section 13 shown in FIG. 2 controls the output of the engine/generator unit 12, and is provided with the control panel 79 in the upper half section, and the inverter unit 78 in the lower half section. A switch for starting the engine, and an AC terminal, DC terminal or the like for outputting generated power are provided to the control panel 79 so as to be outwardly exposed from the opening 48 of the case section 46. The inverter unit 78 controls the output frequency of the generator 22.

The knob-accommodating section 168 is a recess for accommodating a knob 112 of the recoil starter 111 shown in FIG. 5. The starter knob 112 is connected to a wire 114 (FIG. 5). When the engine 21 is to be started, the wire 114 is pulled with the starter knob 112, whereby the recoil starter 111 is started.

As shown in FIG. 13, the vertical frame 26 is provided with left and right inside mounting holes 171, 172 formed towards the upper section center 26*a*, a left outside mounting hole 173 formed on the outside of the left inside mounting hole 171, a right outside mounting hole 174 formed on the outside of the right inside mounting hole 172, and a center mounting hole 175 formed on substantially the center of the vertical frame 26.

A front-end section 27*b* of the center frame 27 is mounted on the left and right inside mounting holes 171, 172, the left and right outside mounting holes 173, 174, and the center mounting hole 175, together with the handle support section 128.

The handle support section 128 is provided with a base section 181 extending in the lateral direction of the engine generator, and left and right bracket sections 182, 183 extending upwards from the left and right end sections of the base section 181.

The base section 181 is provided with left and right inside mounting holes 185, 186 formed coaxially with respect to the left and right inside mounting holes 171, 172 of the vertical frame 26, and left and right outside mounting holes 187, 188 formed coaxially with respect to the left and right outside mounting holes 173, 174 of the vertical frame 26.

Left and right support holes 182*a*, 183*a* are formed on the left and right bracket sections 182, 183 respectively. A support shaft 131 (FIG. 5) of the draw handle 125 is supported by in a penetrating state the left and right support holes 182*a*, 183*a*. Accordingly, the draw handle 125 shown in FIG. 5 is attached to the upper section center 26*a* of the vertical frame 26 via the handle support section 128, so as to be capable of swinging in the vertical direction, The center frame 27 is a backbone member (spine member) formed from an aluminum material, and is provided with a frame beam section 195 mounted on the vertical frame 26, and a frame leg section 196 provided to a distal end section 195*a* of the frame beam section 195 and mounted on the bottom cover 25.

The frame beam section 195 is provided with an upper beam section 197 extending towards the rear from the top end of the front-end section 27*b*, a lower beam section 198 extending towards the rear from the bottom end of the front-end section 27*b*, and a plurality of cross sections 199 extending so as to incline between the upper beam section 197 and the lower beam section 198. The upper and lower beam sections 197, 198 are each formed to be substantially U-shaped in cross section, and are reinforced by ribs 197*a*, 198*a* respectively. The cross sections 199 are formed to be substantially U-shaped in cross section. The frame beam section 195 can thus be made lighter, and at the same time, adequate stiffness of the frame beam section 195 can be obtained.

The frame leg section 196 is formed to be substantially U-shaped in cross section, and is reinforced by a rib 196*a*. The frame leg section 196 can thus be made lighter, and at the same time, adequate stiffness of the frame leg section 196 can be obtained.

Forming the center frame 27 from an aluminum material, and forming the frame beam section 195 and the frame leg section 196 to be shaped substantially as the letter U or the like in cross section, allows the center frame 27 to be made lighter and adequately stiff.

The frame beam section 195 extends horizontally along the bottom cover 25, from the upper center 26*a* of the vertical frame 26 to the rear-end center section 25*e* of the bottom cover 25.

The frame leg section 196 extends downwards from the distal end section 195*a* of the frame beam section 195 to the rear-end center section 25*e*, and is mounted on the rear-end center section 25*e*.

The center frame 27 is formed to be substantially L-shaped by the frame beam section 195 and the frame leg section 196.

As described above, the center frame 27 is formed to be substantially L-shaped by the frame beam section 195 and the frame leg section 196, and the frame leg section 196 is disposed between the rear-end center section 25*e* of the bottom cover 25 and the distal end section 195*a* of the frame beam section 195. Accordingly, the frame beam section 195 is disposed in a relatively high position above the engine/generator unit 12 (FIG. 10). A space 200 within which the engine/generator unit 12 is disposed is thereby secured below the frame beam section 195.

The front-end section 27*b* of the center frame 27 is formed to be T-shaped with a front horizontal section 27*c* and a front vertical section 27*d*. Nuts (not shown) are insert-molded on the front horizontal section 27*c* coaxially with respect to the left and right inside mounting holes 171, 172 of the vertical frame 26, and left and right mounting holes 201, 202 are formed on the front horizontal section 27*c* coaxially with respect to the left and right outside mounting holes 173, 174 of the vertical frame 26.

A nut (not shown) is insert-molded on the front vertical section 27*d* coaxially with respect to the center mounting hole 175 of the vertical frame 26.

The front horizontal section 27*c* of the front-end section 27*b* of the center frame 27 is fastened by bolts 129, 129 to the upper section center 26*a* of the vertical frame 26, together with the handle support section 128. A bolt 129 is used to mount the front vertical section 27*d* of the front-end section 27*b* of the center frame 27 to the central mounting hole 175 formed in substantially the center of the vertical frame 26.

The rear-end lower section 27*e* of the center frame 27 is installed on the rear-end center section 25*e* of the bottom cover 25. A pair of mounting holes 206, 206 are formed on the rear-end lower section 27*e* coaxially with respect to the pair of nuts 158 of the rear-end center section 25*e*. The rear-end lower section 27*e* of the center frame 27 is mounted on the rear-end center section 25*e* of the bottom cover 25 using bolts 159, 159. The center frame 27 is thereby disposed between the upper section center 26*a* of the vertical frame 26 and the rear-end center section 25*e* of the bottom cover 25.

The vertical frame 26 and the center frame 27 of the skeletal member 11 are formed to be T-shaped when viewed from above. Accordingly, the center frame 27 prevents the vertical frame 26 from toppling in the direction orthogonal to the direction of the plane.

As described earlier, forming the width W of the vertical frame 26 to be substantially the same size as the bottom cover 25 prevents the vertical frame 26 from toppling widthways. The skeletal member 11 can accordingly be formed so as to have high stiffness using the three members comprising the bottom cover 25, the vertical frame 26, and the center frame 27.

Forming the bottom cover 25 and the vertical frame 26 from a high-stiffness resin so as to reduce thickness, and forming the center frame 27 from an aluminum material so as to increase stiffness allows adequate stiffness of the skeletal member 11 to be ensured, and the skeletal member 11 to be reduced in weight.

Supporting the case 17 using this high-stiffness skeletal member allows the stiffness of the case 17 to be kept low. The case 17 can therefore be formed from polypropylene (PP) instead of steel, and reduced in weight.

By reducing the weight of the skeletal member 11 while also reducing the weight of the case 17 thus allows the engine generator 10 to be made lighter, and the engine generator 10 imparted with adequate stiffness.

Mounting the handle support section 128 to the vertical frame 26 of the high-stiffness skeletal member 11 allows the handle support section 128 to be securely anchored. Supporting the support shaft 131 (FIG. 5) of the draw handle 125 using the handle support section 128 allows the draw handle 125 to be securely mounted.

Figure 14:
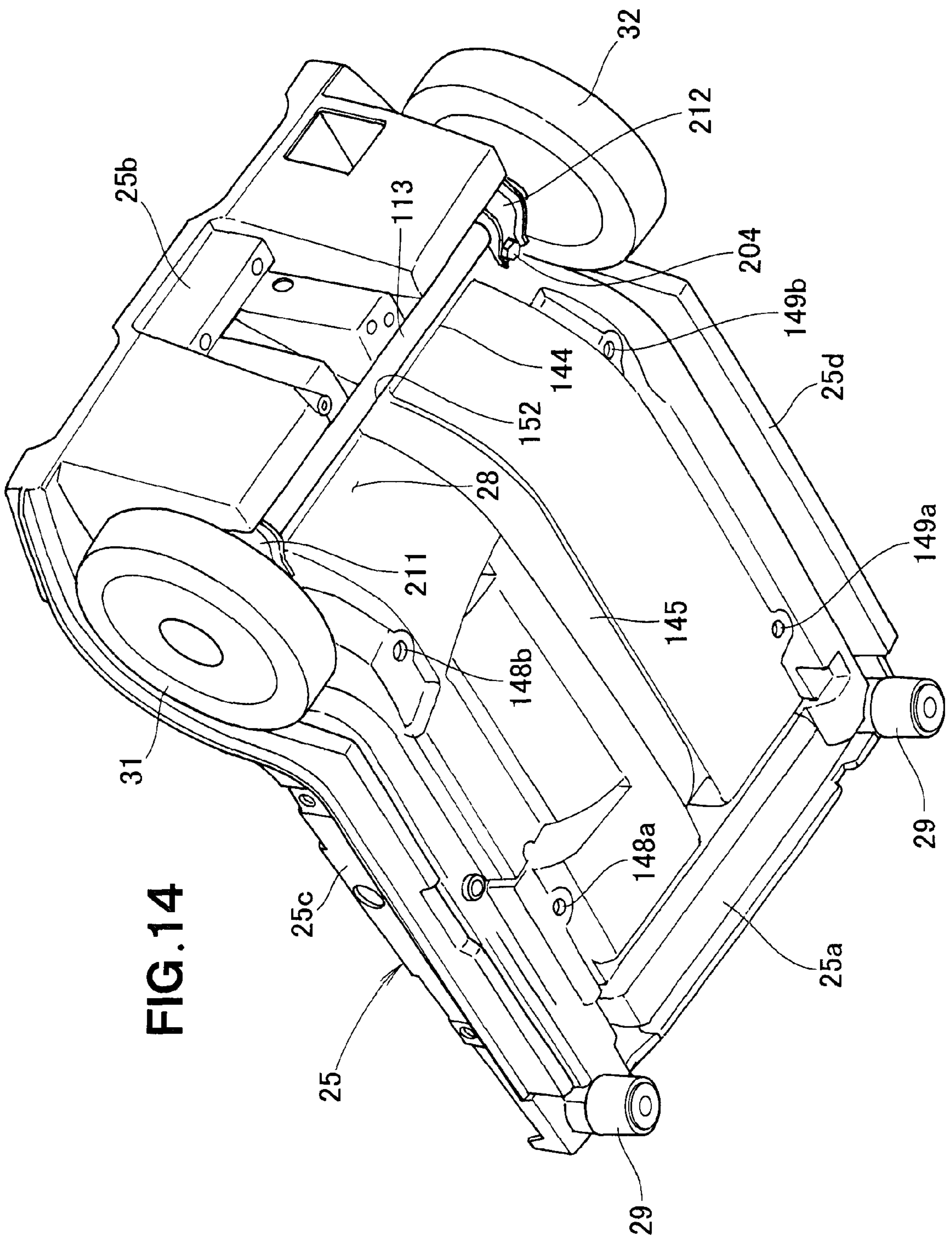
FIG. 14 is a perspective view of the bottom cover of FIG. 13 as seen from below.

As shown in FIG. 14, mounting the axle 113 to the accommodating recess 152 of the axle lateral rib 144 using the left and right axle support members 211, 212 allows the axle 113 to be used as a reinforcing member of the bottom cover 25. Accordingly, the stiffness of the bottom cover 25 can be increased without separately providing a member for reinforcing the bottom cover 25.

As shown in FIG. 12, providing the front lateral rib 141, the front-vicinity lateral rib 142, the rear lateral rib 143, the axle lateral rib 144, the central rib 145, the left side rib 146, the right side rib 147, the left-vicinity side rib 148, and the right-vicinity side rib 149 to the bottom cover 25 allows the stiffness of the bottom cover 25 to be increased.

In particular, having the axle lateral rib 144, and the central rib 145 that is orthogonal to the axle lateral rib 144 and extends in the longitudinal direction of the engine generator 10 provided on the bottom cover 25 allows each of the ribs 144, 145 to effectively increase the stiffness of the bottom cover 25.

Providing a axle lateral rib 144 and a central rib 145, or a similar arrangement, on the bottom cover 25, and mounting the axle 113 to the accommodating recess 152 of the axle lateral rib 144 thus allows the bottom cover 25 to be made sufficiently light, as well as allowing the bottom cover 25 to be made adequately stiff.

Referring again to FIG. 2, providing an adequate wheel accommodation space 38 below the cylinder block 35 of the engine 21 allows the left and right wheels 31, 32 to be disposed in the wheel accommodation space 38. Accordingly, the left and right wheels 31, 32 can be disposed upwards (i.e. a high position). The axle 113 can, thereby, be positioned above the mounting member 33 of the engine/generator unit 12.

Specifically, the height H2 of the axle 113 is made greater (higher) than the height H3 of the mounting member 33, as shown in FIG. 3. By positioning the left and right wheels 31, 32 using the wheel accommodation space 38, the left and right wheels 31, 32 can thus be disposed upwards (in a high position). This allows the size of the engine generator 10 to be reduced.

In the present embodiment, a description was given for an example in which the left and right wheels 31, 32 are provided to the rear-end section 25*b* of the bottom cover 25, and leg sections 29 are provided to the front-end section 25*a* of the bottom cover 25. However, this arrangement is not provided by way of limitation, and the wheels can be provided instead of the leg sections 29 of the front-end section 25*a*.

The skeletal member 11, the case 17, the bottom cover 25, the vertical frame 26, the center frame 27, the left and right leg sections 29, the mounting members 33, the draw handle 125, and the like shown in the embodiment are not limited to the depicted shapes, and may be suitably modified.

Obviously, various minor changes and modifications of the present invention are possible in light of the above teaching. It is therefore to be understood that within the scope of the appended claims the invention may be practiced otherwise than as specifically described.

What is claimed is:

1. An engine generator comprising:

a bottom cover to which left and right wheels are provided via an axle;

an engine/generator unit having an engine and a generator driven by and integrated with the engine, the engine/generator unit being provided above the bottom cover via a plurality of mounting members;

a case for accommodating the engine/generator unit jointly with the bottom cover; and a draw handle vertically swingably provided on an upper section of the case on a side opposite from a side where the left and right wheels are provided, wherein the engine includes a drive shaft extending parallel to the axle and a cylinder disposed in an inclined state pointing upwards in a direction of the side where the left and right wheels are provided, and wherein, the axle is positioned directly below the cylinder and above the mounting members, and the wheels provided on the axle are disposed internally of side walls of the case.

2. The engine generator of claim 1, wherein each of the right and left wheels is accommodated in a recess formed respectively in two corner sections of the bottom cover, and portions of the wheels exposed from each of the recesses contact a road surface.

3. The engine generator of claim 1, wherein the bottom cover includes right and left leg sections provided at two corner sections of the bottom cover, the corner sections being in positions opposite from positions where the wheels are provided, and the wheels and the legs support the bottom cover substantially horizontally.

4. The engine generator of claim 1, wherein the bottom cover comprises:

an axle lateral rib having an accommodating recess, formed on a bottom surface of the bottom cover, for accommodating the axle of the wheels; and a central rib provided at a widthwise center of the bottom cover and extending longitudinally of the engine generator so as to be orthogonal to the axle lateral rib.

* * * * *